Feb. 26, 1957  R. D. DEANIN  2,783,166
PRESSURE-SENSITIVE ADHESIVE SHEET MATERIALS
PREPARED FROM BUTADIENE POLYMER EMULSIONS
Filed Dec. 16, 1953
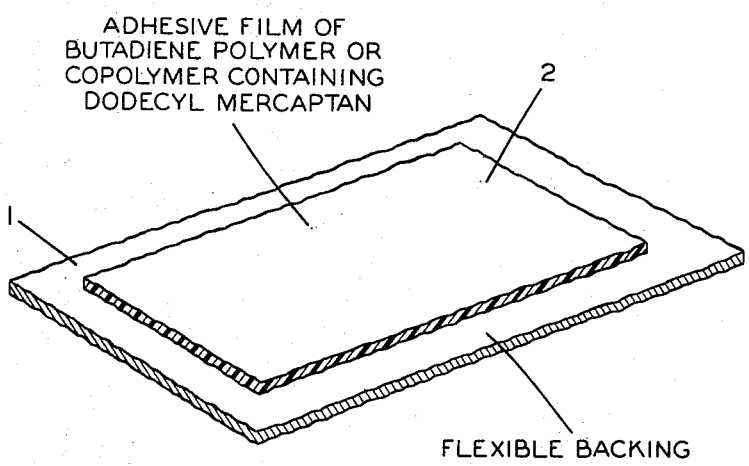
INVENTOR
RUDOLPH D. DEANIN
BY Elizabeth Hunter
ATTORNEY

United States Patent Office 2,783,166
Patented Feb. 26, 1957

2,783,166

PRESSURE-SENSITIVE ADHESIVE SHEET MATERIALS PREPARED FROM BUTADIENE POLYMER EMULSIONS

Rudolph D. Deanin, Florham Park, N. J., assignor to Allied Chemical & Dye Corporation, New York, N. Y., a corporation of New York Application December 16, 1953, Serial No. 398,628

4 Claims. (Cl. 117—122)

This invention relates to pressure-sensitive adhesive materials having high degrees of pressure stickiness and bonding strength, and more particularly to the provision of flexible sheet materials of this character which retain both their normally sticky pressure-sensitive condition and high degree of bonding strength over prolonged periods of time.

Pressure-sensitive adhesives, for coating electrical insulation, surgical bandages, household and office tapes ("Scotch" tape), sheets and the like, have been prepared in the past from a number of materials, including rubber, synthetic elastomers and the like, usually with admixture of plasticizers and resins to impart the desired tackiness or stickiness required to cause the tape or sheet to adhere to a solid surface upon the application of light pressure. For many purposes the adhesive must not only adhere to the surface, but, after application of the tape to the surface, must form a strong bond therewith and must resist removal therefrom to a greater or lesser degree, depending on the use to which it is put, bandage adhesives being softer and less tenacious, for example, than tape suitable for electrical insulation.

Unfortunately, materials which provided strong bonding characteristics were often found to have poor stickiness or pressure sensitivity, and, on the other hand, those materials which provided sticky characteristics were often not only lacking in strength, but often lost their stickiness after application to the backing, upon storage for appreciable lengths of time. Similarly, blends of materials designed to provide a compromise between tensile strength of the utimate bond, and initial pressure sensitiveness, often resulted in adhesives which lost their sticky, pressure-sensitive characteristics on ageing or storage, so that often, expensive packaging of such pressure-sensitive tapes, for example in air-tight containers, was resorted to, to prolong the life of such products.

An object of the present invention is to provide pressure-sensitive adhesive sheet materials having superior ageing characteristics.

Another object of the invention is to provide normally sticky, adherent pressure-sensitive sheet materials including tapes, which provide good bonding characteristics and which retain both their sticky, pressure-sensitive adhesive characteristics and their ability to impart high bonding strength over prolonged periods of time.

These and other objects are accomplished according to my invention which provides adhesive sheet materials formed from aqueous latex dispersions of low molecular weight polymers of a character such as may be prepared by emulsion polymerization in the presence of between about 2% and about 8% of an alkyl mercaptan such as dodecyl mercaptan, of a monomeric charge selected from the group consisting of butadiene and mixtures thereof with at least one of acrylonitrile, methacrylonitrile, styrene, alphamethyl styrene and methyl methacrylate, applied to flexible backing materials, and subsequently dehydrated.

By superior ageing characteristics is meant ability of the adhesive to retain, over a prolonged period, its ability to stick to a solid surface with which it is brought into contact under light pressure such as is capable of being exerted in a manual application of a tape or sheet, and after such adhesion, to impart a strong bond, that is, to resist removal under the exertion of tension on the adhesive bond.

It is well known to carry out emulsion polymerization of butadiene and mixtures thereof with other polymerizable monomers in the presence of alkyl mercaptans such as dodecyl mercaptan, using, for example, quantities ranging from about 0.5% to about 1% to produce synthetic rubbers on the one hand, and on the other hand, using larger quantities, up to about 12% to produce liquid softeners and plasticizers for synthetic rubbers.

I have found, surprisingly, that if butadiene or copolymers of butadiene with the monomers indicated, are emulsion polymerized in the manner conventionally employed for the preparation of synthetic rubber of the GRS type, except that the quantities of alkyl mercaptan used are considerably higher and are within the narrow ranges specified, that low molecular weight polymers are produced which have characteristics of stickiness and adhesiveness between those of the usual hard, non-sticky, synthetic rubbers, and the liquid plasticizers, and which, when applied to any desired backing material directly from the aqueous emulsion in which the polymerization occurred, produce adhesives which have a high degree of tensile strength and which not only have a high initial stickiness and pressure sensitiveness, but which also retain their initial sticky, pressure-sensitive characteristics and ability to provide a strong bond, for long periods of storage or ageing.

The pressure-sensitive adhesive materials of my invention are prepared by conventional emulsion polymerization procedures of the character employed in preparing synthetic rubbers of the GRS type in the presence of polymerization catalysts such as potassium persulfate and the indicated quantities of alkyl mercaptan molecular weight regulator. In the case of copolymers, proportions of comonomer to butadiene may be used up to about 50% of comonomer based on the total weight of monomer charge, usually, however, the butadiene will predominate, and quantities of 25 parts of the comonomer and 75 parts of butadiene produces a satisfactory material. Thus, a charge of water and emulsifying agent such as a soap, may be mixed in proportions to form a gel when cooled, then catalyst, monomer charge and alkyl mercaptan may be added and the charge agitated in a water bath at about 50° C. until the polymerization reaction is substantially complete.

A typical formulation of this character is illustrated in Table 1 below:

TABLE 1

*Typical formula for producing adhesive emulsion*

| Material: | Parts by weight |
|---|---|
| Water | 180 |
| Soap flakes | 5 |
| Potassium persulfate | 0.3 |
| Alkyl mercaptan | 2 to 8 |
| Butadiene | 100 or 75 |
| Comonomer | 0 or 75 |

Completion of the polymerization reaction usually occurs, when using the percentages of alkyl mercaptan indicated, in periods varying between about 15 hours and about 40 hours, depending primarily on the monomer charge used. Typical reaction times for the several types of charges are listed below in Table 2.

TABLE 2

*Typical reaction times for complete polymerization of different monomer charges*

| Comonomer 25% | Reaction time hours |
|---|---|
| None (polybutadiene) | 33–44 |
| Acrylonitrile | 17–21 |
| Alpha methyl styrene | 38 |
| Methacrylonitrile | 16–21 |
| Methylmethacrylate | 21 |
| Styrene | 38 |

The reactions of polybutadiene and of copolymers thereof with the comonomers indicated, all produce stable latices which, on evaporation of water therefrom, leave sticky, adhesive films.

Adhesive sheet materials may be prepared from the latices thus formed by any suitable coating or impregnating process in which the latex is spread on or applied to the desired backing, and dried to evaporate the water. Care should be taken, however, not to carry out the evaporation under unduly drastic conditions of high temperature or for prolonged periods, as such drying procedures tend to impair the adhesive qualities of the film. For example, at drying temperatures of about 60° C., time of drying preferably should not markedly exceed about 16 hours. At lower temperatures, longer drying times may be used.

The accompanying drawing shows, in perspective view, adhesive sheet material of my invention, comprising a flexible sheet backing material 1, coated with a film 2, of adhesive of the class defined herein. The film 2 is shown partly cut away to expose the backing material.

The adhesive films may be applied, as by coating or impregnation, to any desired flexible sheet backing material, including metal, fabric, paper, natural or synthetic sheet and tape materials, such as cloth, cellulose and cellulose derivative sheets and tapes, etc.

The following example illustrates the preparation and characteristics of adhesive coated surfaces prepared according to the invention.

EXAMPLE 1

Latices of polybutadiene alone and mixed in the proportion of 75% with 25% of methacrylonitrile and 25% acrylonitrile respectively, were prepared according to the typical procedures described above using proportions of dodecyl mercaptan varying from 0.5% to 10% by weight, based on the weight of the monomer charge, and were spread upon circular flexible aluminum foil discs by pouring a few cubic centimeters of the latex into cylindrical aluminum dishes of the type used in carrying out laboratory moisture determinations, to cover the bottom with a film of latex. The latices in the dishes were then evaporated to dryness in an air oven at 60° C. in about 16 hours. After the latices were dry, the walls of the dishes were cut away except for a small tab, leaving standard size discs of adhesive on aluminum foil backing.

The adhesive characteristics of the resulting films were evaluated by placing an aluminum foil disc of a character similar to the backing, upon the face of the adhesive film, placing a one-kilogram weight upon the top disc, thus producing a pressure of about 65 grams per square centimeter, and allowing it to remain in place for 10 seconds, then removing it. For comparison purposes, test samples of a commercial, bandage type adhesive tape and a commercial "Scotch" tape were prepared by placing a ½ inch wide sample of each, across separate standard aluminum foil discs, and pressing with a 1 kilogram weight for 10 seconds.

To test the strengths of the adhesive bonds thus produced, the test samples were subjected to tensile tests in a Standard Scott inclined plane tensile strength tester which comprises a horizontal beam on which are mounted cooperating jaws. The left hand jaw is fixed to one end of the beam, the right being attached to a movable carriage mounted on rails attached to the beam and equipped for holding weights of the desired magnitude. The entire beam assembly is pivoted for circular movement by a force operating through a vertical gear at the right hand end of the beam to tilt the beam at a constant rate, thus permitting the weighted carriage to tend to roll down the inclined plane and to exert a constantly increasing pull on the sample, always at 90° to the adhesive bond, as the inclination of the beam increases.

In carrying out the tests the respective tabs of the backing members of the adhered samples were fastened into the respective jaws of the tester with the beam in horizontal position. A load was applied to the carriage of sufficient magnitude to completely separate the adhesive bonds of the samples within the 20 second time scale of the test. The pivoting mechanism was set in motion, tilting the horizontal beam at a constant rate of pull, the weighted carriage sliding down the inclined plane as the sample pulled apart. A chart recorded in grams the component of the load being applied to the sample at any moment. The final reading, at the point at which the sample was completely pulled apart, was recorded, and this value was divided by the area of the adhered portion of the sample to give comparative values representative of work done, recorded in Table 3 below, as grams per square centimeter.

Tests were made as described above on films as initially prepared, and on successive days after ageing in an air oven at 120° C. until the sample exhibited zero adhesiveness. Such oven ageing is in the nature of an "accelerated" ageing test–each day of ageing under the conditions employed being roughly equivalent to ageing under normal storage conditions of about a year.

The results of these tests are tabulated in Table 3 below:

TABLE 3

*Adhesive strengths in grams per square centimeter of films of polybutadiene, polybutadiene-acrylonitrile and polybutadiene-methacrylonitrile obtained from latices polymerized in the presence of varying proportions of dodecyl mercaptan, as initially prepared and after ageing at 120° C. for periods indicated*

| Polymer | Percent DDM | Tensile strength after days in oven | | | |
|---|---|---|---|---|---|
| | | 0 | 1 | 2 | 3 |
| PBD | 0.5 | 3.9 | 0 | 0 | 0 |
| | 1.0 | 8.6 | 0 | 0 | 0 |
| | 2.0 | [1] 62.2 | 0 | 0 | 0 |
| | 3.0 | 25.4 | 0 | 0 | 0 |
| | 4.0 | 20.3 | 7.5 | 3.4 | 3.5 |
| | 5.0 | 13.0 | 8.7 | 3.4 | 0 |
| | 6.0 | 10.1 | 8.1 | 3.7 | 0 |
| | 8.0 | 6.3 | 3.7 | 3.8 | 0 |
| | 10.0 | 5.6 | 4.4 | 0 | 0 |
| BD/MAN 75/25 | 0.5 | 3.2 | 3.4 | 0 | 0 |
| | 1.0 | 4.8 | 4.6 | 3.5 | 0 |
| | 2.0 | 45.8 | 14.5 | 10.6 | 0 |
| | 3.0 | 34.3 | 35.4 | 46.8 | 4.2 |
| | 4.0 | 18.1 | 30.4 | 30.4 | 5.2 |
| | 5.0 | 13.0 | 14.9 | 9.2 | 4.2 |
| | 6.0 | 10.6 | 12.5 | 8.0 | 4.3 |
| | 8.0 | 8.1 | 8.5 | 8.1 | 5.0 |
| | 10.0 | 6.2 | 6.3 | 4.7 | 4.2 |
| BD/AN 75/25 | 0.5 | 5.7 | 0 | 0 | 0 |
| | 1.0 | 3.9 | 3.6 | 0 | 0 |
| | 2.0 | 5.8 | 3.5 | 0 | 0 |
| | 3.0 | 12.1 | 6.5 | 0 | 0 |
| | 4.0 | 57.2 | 39.7 | 7.3 | 7.1 |
| | 5.0 | 26.1 | 43.5 | 12.0 | 14.3 |
| | 6.0 | 18.4 | 26.0 | 10.4 | 10.4 |
| | 8.0 | 11.2 | 17.3 | 19.2 | 5.2 |
| | 10.0 | 6.8 | 9.9 | 8.5 | 7.9 |
| Commercial Tapes: | | | | | |
| Adhesive Bandage | | 16.7 | 0 | 0 | 0 |
| "Scotch" Tape | | 52.3 | 0 | 0 | 0 |

[1] Over.

From Table 3 it will be seen that films deposited from polymerized butadiene and from copolymerized butadiene with acrylonitrile and methacrylonitrile respectively, polymerized in the presence of up to about 1% dodecyl mercaptan, exhibit very little adhesiveness. Increasing dodecyl mercaptan concentration produces a decrease in the molecular weight of the resulting polymer and an increase in its softness and stickiness, increasing its adhesiveness, or ability to stick to other materials. Concomitantly, however, with increase in adhesiveness, the ability of the film to hold together (cohesiveness) decreases. The practical adhesive strength of the films, as measured by the tests recorded in Table 3, depends upon both adhesion and cohesion. It is apparent from the table that optimum adhesive properties are obtained at intermediate concentrations of dodecyl mercaptan where the molecular weight of the polymer is low enough to provide good stickiness but not so low as to cause low cohesive strength of the adhesive itself.

It is also apparent that optimum adhesiveness is obtained at somewhat different concentrations of dodecyl mercaptan for different polymers, the optimum for polybutadiene lying between about 4% and about 6%, for polybutadiene-acrylonitrile between about 4% and about 8%, and for polybutadiene-methacrylonitrile between about 2% and about 6%.

In general, the polymers prepared in the presence of slightly lower than the optimum concentrations of dodecyl mercaptan exhibit high initial adhesive strengths but lose their adhesive strength upon ageing for relatively short periods. Thus, while best initial adhesiveness is exhibited by polybutadiene polymerized in the presence of about 2% dodecyl mercaptan, highest ageing characteristics are imparted by 4%. With polybutadiene-methacrylonitrile, 2% gave best initial strength, 2–8% gave good ageing, the overall optimum being at about 3%. With polybutadiene-acrylonitrile, 4% dodecyl mercaptan concentration gave best initial adhesiveness, 5% gave best ageing. In order to be comparable to commercial adhesive bandage tapes, which eventually must yield fairly readily to removal by stripping, the bonding strength at time of use should be equivalent to a tensile strength measured as indicated above between about 7.5 and about 20 whereas insulating tapes, "Scotch" tapes and the like which are to remain relatively permanently affixed to the solid to which they are applied, will require a bonding strength at the time of application of somewhat higher values, for example up to about 60 or higher. Thus, in general, my preferred adhesives will have bonding strength values of at least about 7.5, preferably higher initially, measured as indicated above, and will resist reduction below this figure on accelerated oven ageing carried out as described, for at least about 1 day.

Table 3 therefore illustrates that polymers having such characteristics as result from emulsion polymerization as described, in the presence of from about 2% to about 8% of dodecyl mercaptan, are useful as pressure-sentitive adhesives of superior ageing characteristics and that especially desirable properties of initial and maintained stickiness and bonding characteristics are possessed by polymers of such character as result from emulsion polymerization as described, in the presence of from about 4% to about 6% of dodecyl mercaptan in the case of polybutadiene; from about 2% to about 8% in the case of butadiene-methacrylonitrile polymers, and from about 4% to about 8% in the case of butadiene-acrylonitrile polymers.

EXAMPLE 2

Latices of butadiene alone and with 75%–25% blends with each of methyl methacrylate, styrene, alpha methyl styrene, methacrylonitrile and acrylonitrile were prepared by the typical procedures described above, using 5% of dodecyl mercaptan in each case. Films of these latices were cast on flexible metal foil in a manner similar to that described under Example 1, and test samples thereof were subjected to shear tests in the Standard Scott inclined plane tester. In this test a force is applied to the film at an angle of 180° to the adhesive bond. Results are shown in Table 4 below in grams per square centimeter of film.

TABLE 4

*Adhesive strengths of polybutadiene along and in 75%–25% blends with comonomers, prepared in the presence of 5% dodecyl mercaptan*

| Comonomer: | Shear strength |
|---|---|
| None (PBD) | 10.9 |
| Methyl methacrylate | 16.4 |
| Styrene | 16.6 |
| Alpha methyl styrene | 17.2 |
| Methacrylonitrile | 23.4 |
| Acrylonitrile | over 30.0 |

While the above describes the preferred embodiments of my invention, it will be understood that departures may be made therefrom within the scope of the specification and claims.

I claim:

1. A pressure-sensitive adhesive sheet material having superior ageing characteristics comprising a flexible backing sheet having applied thereto a pressure-sticky layer of a low molecular weight polymer selected from the group consisting of emulsion polymerized butadiene polymer and copolymers thereof with at least one monomer selected from the group consisting of acrylonitrile, methacrylonitrile, styrene, alpha methyl styrene and methyl methacrylate, obtained by emulsion polymerization of the monomeric charge in contact with between about 2% and about 8% dodecyl mercaptan based on the weight of the monomer charge.

2. The adhesive material according to claim 1 wherein the polymer is a butadiene homopolymer obtained by emulsion polymerization of butadiene in contact with between about 4% and about 6% dodecyl mercaptan.

3. The adhesive material according to claim 1 wherein the polymer is a butadiene-acrylonitrile polymer obtained by emulsion copolymerization of butadiene and acrylonitrile in contact with between about 4% and about 8% of dodecyl mercaptan.

4. The adhesive material according to claim 1 wherein the polymer is a butadiene-methacrylonitrile polymer obtained by emulsion copolymerization of butadiene and acrylonitrile in contact with between about 2% and about 8% of dodecyl mercaptan.

References Cited in the file of this patent

UNITED STATES PATENTS

| 2,487,060 | Pike | Nov. 8, 1949 |
| 2,572,459 | Eustis | Oct. 23, 1951 |
| 2,576,148 | Schechtman | Nov. 27, 1951 |
| 2,637,710 | Hulse | May 5, 1953 |
| 2,649,425 | Hulse | Aug. 18, 1953 |